United States Patent
Qiu et al.

(10) Patent No.: US 11,374,489 B2
(45) Date of Patent: Jun. 28, 2022

(54) HYBRID BULK CAPACITANCE CIRCUIT FOR AC/DC CHARGER

(71) Applicant: GaN Systems Inc., Ottawa (CA)

(72) Inventors: Yajie Qiu, Kanata (CA); Xuechao Liu, Kanata (CA)

(73) Assignee: GaN Systems Inc., Kanata (CA)

( * ) Notice: Subject to any disclaimer, the term of this patent is extended or adjusted under 35 U.S.C. 154(b) by 0 days.

(21) Appl. No.: 17/070,309

(22) Filed: Oct. 14, 2020

(65) Prior Publication Data

US 2021/0184567 A1 Jun. 17, 2021

Related U.S. Application Data

(60) Provisional application No. 62/946,563, filed on Dec. 11, 2019.

(51) Int. Cl.
*H02M 3/07* (2006.01)
*H02M 7/06* (2006.01)

(52) U.S. Cl.
CPC ............. *H02M 3/07* (2013.01); *H02M 7/06* (2013.01)

(58) Field of Classification Search
CPC ........ H02M 3/07; H02M 7/06; H02M 1/4258; H02M 1/10
See application file for complete search history.

(56) References Cited

U.S. PATENT DOCUMENTS

| | | |
|---|---|---|
| 7,760,524 B2 | 7/2010 | Matthews |
| 10,158,282 B1 | 12/2018 | Maruyama |
| 2017/0317594 A1* | 11/2017 | Lind ............... H02M 7/003 |
| 2018/0367030 A1* | 12/2018 | Lethellier ......... H02M 3/015 |

OTHER PUBLICATIONS

Pickering, Paul; "The Active Clamp Flyback Converter: A Design Whose Time Has Come"; Electronic Design; Apr. 9, 2018; 9 pages.

* cited by examiner

Primary Examiner — Sibin Chen
(74) Attorney, Agent, or Firm — Miltons IP/p.i.

(57) ABSTRACT

A circuit for a multi-voltage input AC/DC charger, such as a Universal AC input AC/DC charger, is provided, comprising a plurality of capacitors having different voltage ratings that are connected in parallel, and a switching circuit comprising input voltage sensing and comparator drive circuitry, to allow for selective connection of one or more of the plurality of capacitors, responsive to a sensed input voltage. Since bulk capacitors occupy a significant proportion of the volume of an AC/DC charger, this solution provides for a reduction in system volume, with associated improvement in the power density of an isolated AC/DC charger.

10 Claims, 6 Drawing Sheets

Hybrid Bulk Capacitance Circuit (HBCC)

A Hybrid Bulk Capacitance Circuit includes:
- Multiple capacitors with different voltage ratings
- A switcher to manage the capacitance for DC link
- Input AC voltage sense
- Voltage control and driver Bulk capacitors occupy ~35% of uncased volume Circuit schematic for
active clamp flyback topology

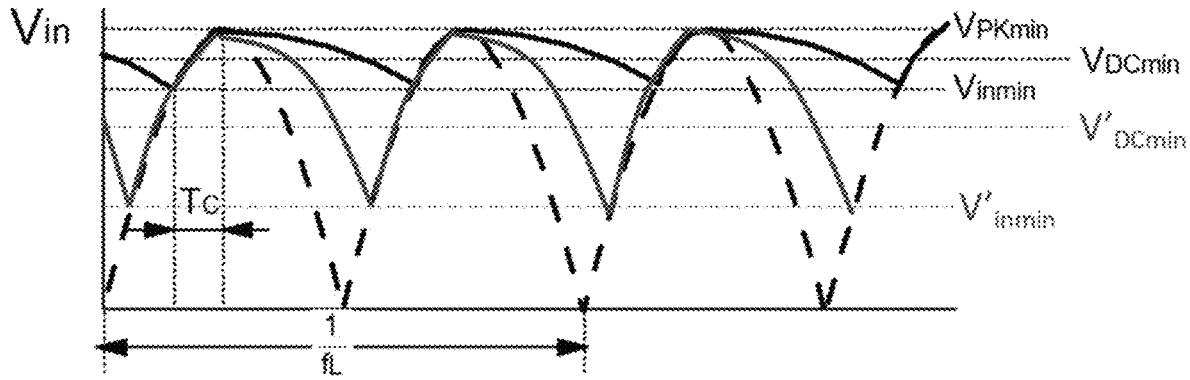

Fig. 3

- Large Bulk Capacitor -> High $V_{DCmin}$ and High $V_{inmin}$:
  - ☺ Lower peak and RMS current through the power MOSFET;
  - ☺ Less Duty Cycle range for regulation;
  - ☹ Larger peak current and RMS current across the AC to DC bridge diode

- Small Bulk Capacitor -> Low $V'_{DCmin}$ and Low $V'_{inmin}$:
  - ☺ Smaller peak current and RMS current across the AC to DC bridge diode
  - ☹ Larger peak and RMS current through the power MOSFET;
  - ☹ Larger Duty Cycle range for regulation;

Fig. 4

$$Pin = \frac{1}{2} C_{in}(V_{pkmin}^2 - V_{inmin}^2) f_L$$

$$C_{in} = \frac{2 Pin}{(V_{pkmin}^2 - V_{inmin}^2) f_L}$$

$f_L = 120Hz$
$V_{pkmin} = \sqrt{2} V_{acmin}$    Assuming: $V_{inmin} = 70\% V_{pkmin}$ e.g. 65W AC/DC Charger Vac=90V~160V        Vac=160V~264V
~120uF/250V         ~47uF/400V Ripple voltage is considered instead of hold up time for AC/DC charger Bulk capacitors having different voltage ratings can be selected for different AC input ranges

Fig. 5

Hybrid Bulk Capacitance Circuit (HBCC)

A Hybrid Bulk Capacitance Circuit includes:
- Multiple capacitors with different voltage ratings
- A switcher to manage the capacitance for DC link
- Input AC voltage sense
- Voltage control and driver

| Solution | Total volume (mm³) | Total price ($CAD) |
|---|---|---|
| Existing | 7854 | 2.452 |
| Proposed | 6008 | 2.279 |
| Difference | 1846 | 0.173 |
| % | 23.5% | 7% |

- Proposed cost includes additional sense and control circuit cost of $0.5 CAD
- Cost based on 1kpcs/yr

HYBRID BULK CAPACITANCE CIRCUIT FOR AC/DC CHARGER

CROSS-REFERENCE TO RELATED APPLICATION(S)

This application claims the benefit of U.S. Provisional Patent Application No. 62/946,563 entitled HYBRID BULK CAPACITANCE CIRCUIT FOR AC/DC CHARGER and filed on Dec. 11, 2019, which is incorporated herein by reference in its entirety.

TECHNICAL FIELD

This invention relates to AC/DC chargers for low power electronics, such as Universal AC input AC/DC chargers, and improvements, e.g. for size reduction and increased power density.

BACKGROUND

In a typical low power AC/DC charger or power adapter, e.g. ≤100 W for small personal electronic devices, bulk capacitors occupy a large percentage of the volume of the casing.

Using GaN power transistors, instead of silicon power transistors provides several advantages. Compared to silicon MOSFETs, GaN HEMTs have lower on-resistance, higher breakdown voltage, no reverse-recovery characteristics and can operate at higher temperatures. GaN devices have much lower switching losses, so they can operate at higher switching frequencies. Higher switching frequencies allow for the use of smaller capacitors and inductors, which can significantly reduce the power converter size, weight and cost.

As an example, in an Anker 65 W AC/DC adapter configured for a Universal AC input of 90-265 VAC and a fixed output voltage of 20V (65 W), based on an ACF topology using a Texas Instruments high-frequency ACF controller TI UCC28780, operating at a switching frequency of 500-600 kHz, provides a power density of 2.9 W/cm$^3$ (47 W/in$^3$) uncased, and 1.7 W/cm$^3$ (27 W/in$^3$) cased. However, approximately 35% of the uncased volume is occupied by the bulk capacitors (e.g. see FIGS. 1A, 1B and 1C).

There is demand for AC/DC chargers, such as Universal AC input AC/DC chargers based on ACF (Active Clamp Flyback) topology or other Flyback topologies, that are more compact and lightweight, and which are powerful enough for charging smartphones, tablets, laptops and other small electronic devices. For example, there is a need for improved or alternative Universal AC/DC chargers providing increased power density.

SUMMARY OF INVENTION

The present invention seeks to provide an improved or alternative multi-voltage AC input AC/DC charger, e.g. a Universal AC input AC/DC charger, having a reduced capacitor volume.

A bulk capacitor circuit is disclosed in which a plurality of bulk capacitors of different voltage ratings are optionally or selectably connectable, dependent on the input voltage.

One aspect of the invention provides a bulk capacitor circuit for a multi-voltage AC input AC/DC charger/adapter comprising: a plurality of bulk capacitors having different voltage ratings; an input for connection to a power source; an output for connection to a DC/DC converter; a switch means for selectively connecting the plurality of the bulk capacitors, between the input and output; an input voltage sensor; and control and driver circuitry; wherein: the control and driver circuitry is configured to receive a signal from the input voltage sensor indicative of the input AC voltage, and responsive to said signal, the circuit operates to control the switch means and connect at least one of the plurality of bulk capacitors.

For example, the plurality of bulk capacitors comprises: a first bulk capacitor having capacitance value C1 and a voltage rating for a first input voltage range including a maximum rated input voltage; a second bulk capacitor having a capacitance value C2 and a voltage rating for a second input voltage range, below the first input voltage range; wherein the circuit operates to connect the first bulk capacitor to provide a capacitance of C1 for the first input voltage range; and to connect the first and second bulk capacitors to provide a combined capacitance value of C1+C2 for the second input voltage range.

Thus, the switch means acts to connect one or more of the plurality of bulk capacitors, in parallel across the input, as needed, dependent on the AC input voltage that is sensed.

The capacitor values C1 and C2 are calculated based on a ripple voltage wherein: wherein: $C=2P_{in}/(V^2_{pkmin}-V^2_{inmin}) f_L$ where $P_{in}$ is the required power, $V_{pkmin}$ is the allowed peak voltage at minimum AC voltage; $V_{inmin}$ is the allowed valley voltage at minimum AC voltage; and $f_L$ is the input AC line frequency.

Where the bulk capacitance circuit comprises more than two capacitors C1 ... Cn, e.g. three or capacitors for different voltage ranges, e.g. the circuit operates to connect the first capacitor for a first input voltage range; to connect first and second capacitors for a second voltage range, and to connect first second and third capacitors for a third input voltage range, wherein the first voltage range is higher than the second voltage range and the second voltage range higher than the third voltage range.

In some embodiments, the first capacitor is always connected, and the second capacitor, and other capacitor(s) if applicable, are optionally or selectively connected in response to the signal indicative of input voltage.

While each of the capacitors C1, C2 ... Cn may comprise a single capacitor, alternatively one or more of the capacitors C1 to Cn may be multiple single capacitors connected in parallel. Capacitor values are selected to meet performance requirements for each input voltage range and to minimize a total capacitor volume of the plurality of capacitors.

For example, where the Universal AC input AC/DC charger is rated for an input of 90-265 VAC and 47-63 Hz, and for a power of ≤100 W, wherein the first input voltage range comprises 160 to 265 VAC and the second input voltage range comprises 90 to 160 VAC, and comprising first and second capacitors, having values C1 rated at 400V and C2 rated at 250V, where C1 is selected for operation in the first (higher) input voltage range, and both C1 and C2 are selected to provide a combined capacitance of C1+C2 for operation in the second (lower) input voltage range. For example, in an embodiment requiring a capacitance C1 of ~50 μF rated at 400V for operation in the range 160-265 VAC, and a capacitance C1+C2 of ~100 μF, i.e. 2×C1, for operation in the 90 to 160 VAC range, two capacitors of different voltage rating, and equal capacitance can be provided, i.e. C1 is ~47 μF 400V and C2 is ~47 μF 400V.

The control and driver circuitry may be implemented at low cost using a comparator driver circuit. It may include an enable/disable control link to the DC/DC converter, which can be used for AC input under-voltage or over-voltage protection.

In an embodiment, the DC/DC converter comprises an active clamp flyback topology. This topology may be implemented using GaN switching transistors to provide a very compact Universal AC input AC/DC charger, with high power density. However, using a standard arrangement of capacitors, in which all capacitors are voltage rated based on the maximum AC input voltage, and have a total capacitance required for operation at the lowest input voltage range, further size reduction is limited by the volume taken up by the bulk capacitors. Implementation of a multi-voltage AC input, or Universal AC input, AC/DC charger using ACF topology or other Flyback topologies, such as QR Flyback, and other topologies, with the hybrid bulk capacitor circuit disclosed herein allows for use of smaller volume capacitors, which reduces the system volume and provides improved power density.

BRIEF DESCRIPTION OF THE DRAWINGS

FIG. 3 shows a plot of voltage waveforms for an example AC/DC charger;

FIGS. 4 and 5 show parameters and equations used to calculate the capacitance values and voltage rating for bulk capacitors for different AC input voltage ranges.

The foregoing and other objects, features, aspects and advantages of the present invention will become more apparent from the following detailed description, taken in conjunction with the accompanying drawings, of some illustrative embodiments of the invention, which description is by way of example only.

DETAILED DESCRIPTION

Figure 1A:
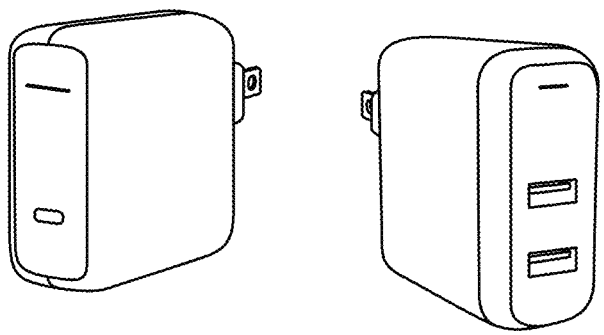
FIGS. 1A, 1B and 1C (Prior Art) shows some views of an example of a 65 W AC/DC charger configured for Universal AC input.
Figure 1B:
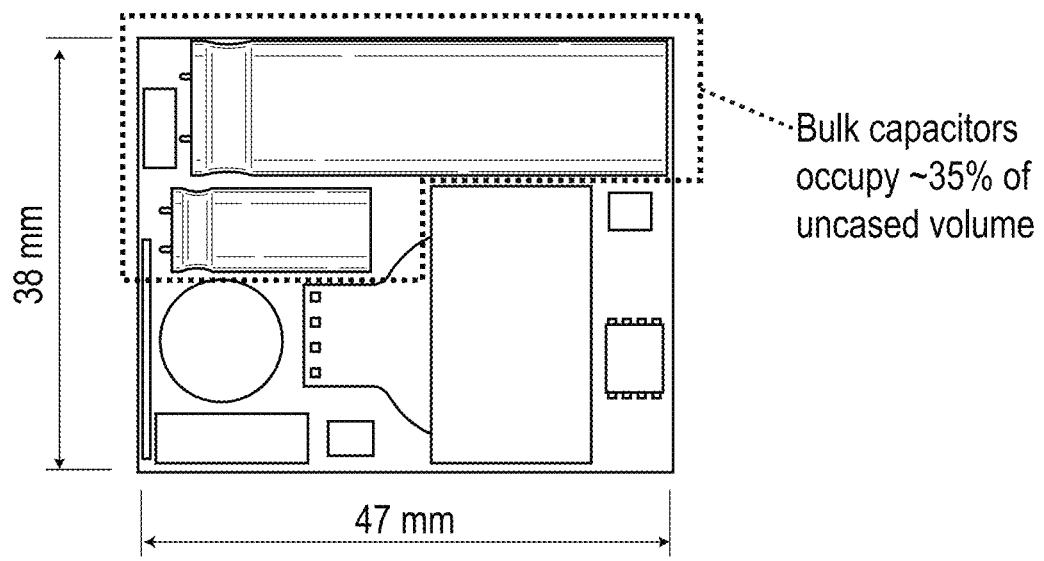
Figure 1C:
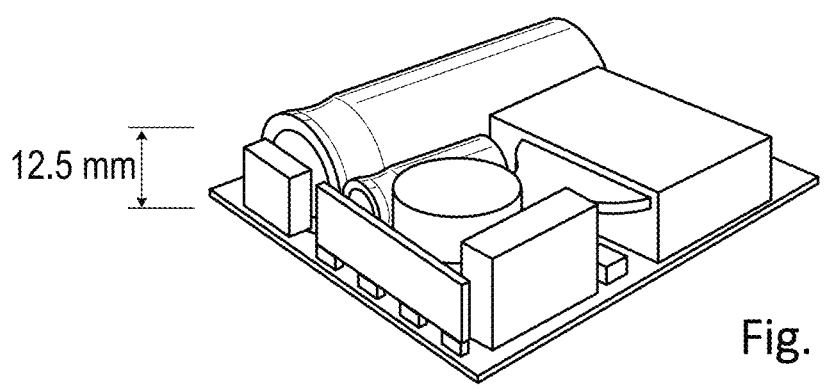

As mentioned above, FIG. 1A shows an example of a small (i.e. ≤100 W) Universal AC/DC charger, or power adapter, such as used for charging smartphones, tablets, laptops and other small electronics. FIGS. 1B and 2B show the external dimensions of the uncased components. FIG. 1B illustrates that the bulk capacitors occupy ~35% of the uncased volume.

Figure 2A:
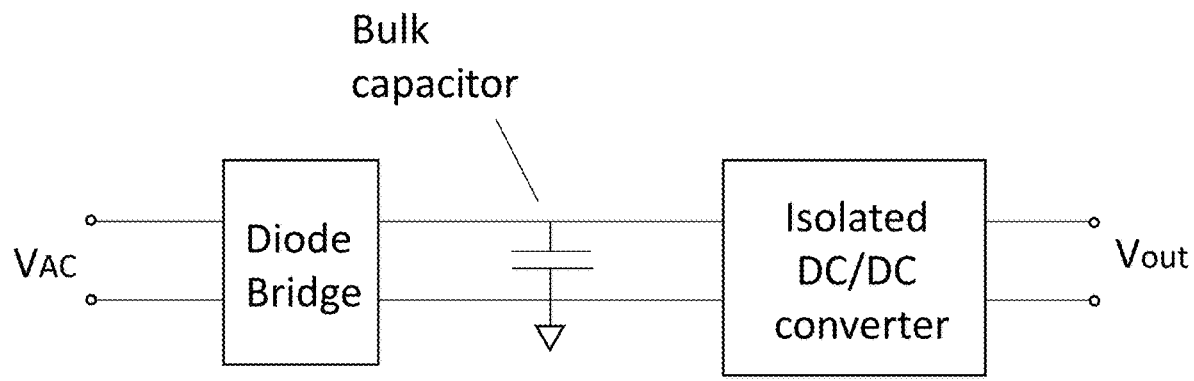
FIG. 2A (Prior Art) shows a functional block diagram for AC/DC charger.
Figure 2B:
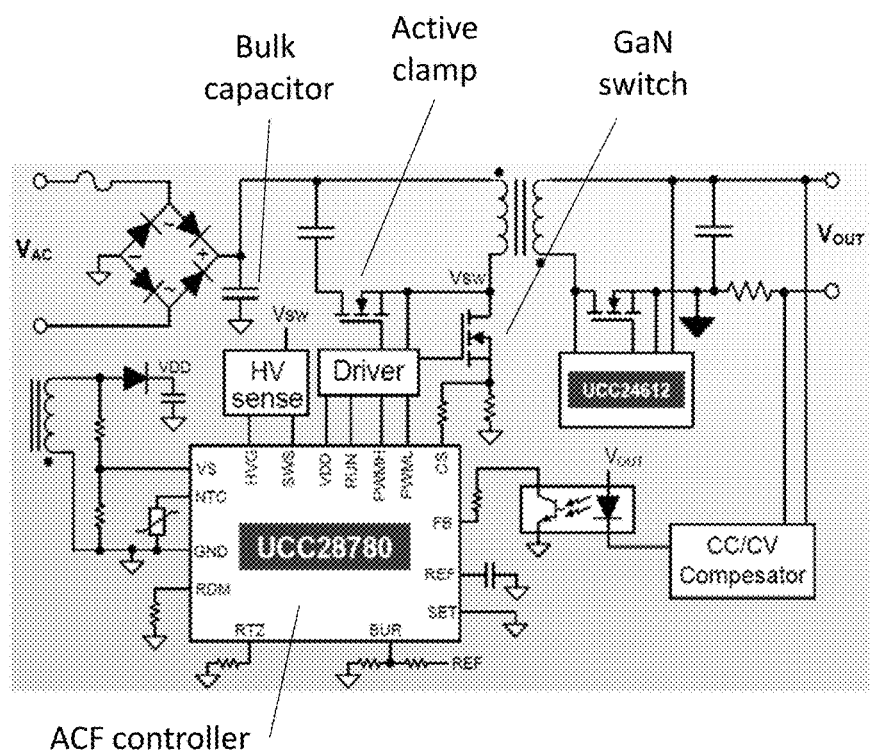
FIG. 2B (Prior Art) shows a circuit schematic for an active clamp flyback (ACF) topology AC/DC charger.

FIG. 2A shows a functional block diagram for a generic AC/DC charger, to show placement of the bulk capacitor.

In example embodiments, ripple voltage is considered instead of hold-up time for a low power AC/DC charger e.g. $P_O \leq 100$ W. A bulk capacitor functions to control ripple voltage and make the input voltage of the isolated DC/DC is always within the regulation capability of the designed AC/DC converter. The bulk capacitor may be one or more capacitors connected in parallel to provide the total required capacitance.

FIG. 2B shows a circuit schematic for a Universal AC/DC charger based on a commonly used active clamp flyback (ACF) topology. For example, a Universal AC/DC adapter for charging small personal electronics is configured for a Universal AC input of 90-265 VAC, and a line frequency of 47-63 Hz; a Texas Instruments high-frequency ACF controller TI UCC28780 is used for operating the GaN power switching transistor, at a switching frequency of 500-600 kHz. For background information, design and operation of AC/DC power converters based on an Active Clamp Flyback topology is reviewed in an article by Paul Pickering, entitled "The Active Flyback Converter: A Design Whose Time Has Come", Electronic Design, Apr. 9, 2018.

In existing circuit designs, a bulk capacitor, or two or more bulk capacitors connected in parallel, are selected to provide a required capacitance value (i.e. for parallel connected capacitors C1, C2 . . . Cn, the total capacitance=C1+ C2+ . . . Cn) and to have a voltage rating the meets or exceeds the maximum rated input voltage. For example, for a maximum rated input voltage of 265 VAC, the capacitors would be rated for 400V, and the capacitor value(s) are calculated based on required specifications, e.g. a required input voltage regulation range.

A plot of example voltage waveforms for an AC/DC charger is shown in FIG. 3, and a comparison of parameters and design considerations for small (i.e. lower capacitance) and large (i.e. higher capacitance) bulk capacitors is shown in FIGS. 4 and 5. In FIG. 4, the black dashed waveform represents the input voltage, i.e. as rectified by the diode bridge. The voltage waveforms V and V', represented respectively by solid black and red lines are for different (large and small) capacitance values of the bulk capacitor for a given input voltage, the ripple frequency of the voltage waveform V and V' are two times of input ac line frequency, there are peak voltage Vpk and valley voltage Vinmin respectively.

Referring to FIG. 5, if the ripple voltage is considered, it can be shown that bulk capacitors having different values and voltage ratings can be selected for different AC input voltage ranges to provide a required ripple voltage, e.g. specifying Vinmin=70% Vpkmin. For example, if the AC/DC charger is only required to operate over a limited AC input voltage ranges, the bulk capacitor value and voltage rating would be selected accordingly to provide an appropriate ripple voltage. FIGS. 4 and 5 shows examples of parameters and equations used to calculate the capacitance values and voltage rating for bulk capacitors for different AC input voltage ranges. As illustrated by the examples shown in FIG. 5, operation in a lower voltage range 90-160 VAC, to achieve a required ripple voltage, requires a high value capacitor, e.g. 120 µF, having a voltage rating of >226V, e.g. 250V; and operation in a high voltage range 160-264V requires a lower value capacitor, e.g. 47 µF having a higher voltage rating >373V, e.g. 400V.

Conventionally, if the AC/DC charger is a Universal AC/DC charger, i.e. intended for worldwide use in multiple countries, the AC input range is specified as, e.g. 90-265 VAC at 47-63 Hz, and all bulk capacitors are selected to have a voltage rating of greater than the maximum voltage rating, i.e. >265V, so typically all capacitors are selected to have a voltage rating of 400V, and the total bulk capacitance value is selected to meet requirements for the entire operational voltage range, especially for a lower AC voltage range, that is, a total bulk capacitance value as required for lower voltage operation, e.g. ~100 µF.

Figure 6:
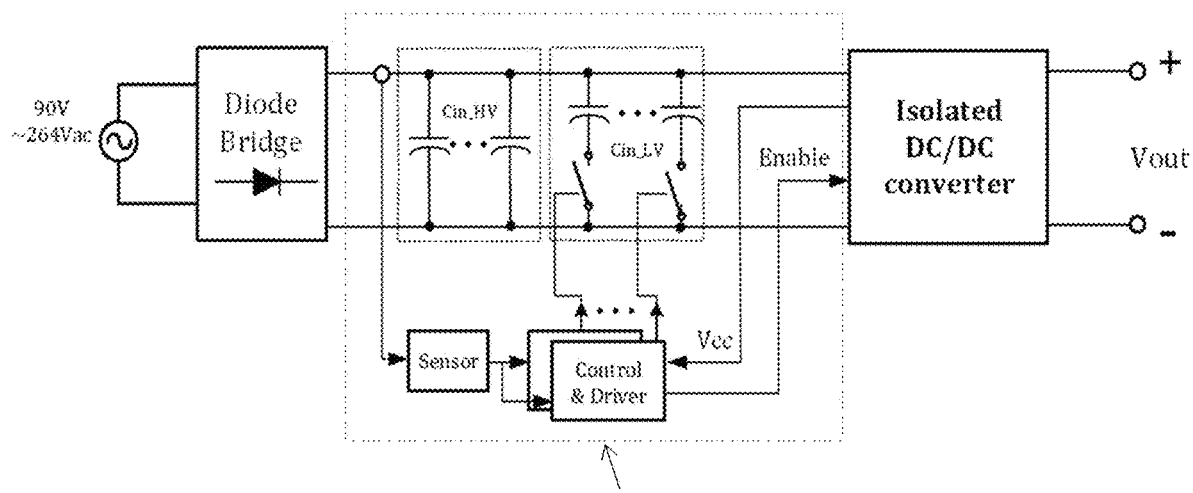
FIG. 6 shows a functional block diagram of a hybrid bulk capacitance circuit of an example embodiment comprising a hybrid bulk capacitance circuit including multiple capacitors for a universal AC input AC/DC charger.

FIG. 6 shows a functional circuit diagram of a universal AC input AC/DC charger, without power factor correction, comprising a hybrid bulk capacitance circuit (HBCC) of an example embodiment. The HBCC comprises a plurality of capacitors of different voltage ratings. The high voltage capacitors Cin_HV (i.e. higher voltage rating, lower capacitance value) are connected across the inputs. The other capacitors Cin_LV, which are rated for lower voltage, are connected across the input with switches and control means to selectively connect the additional capacitance only when needed, i.e. for a lower voltage range AC input. A lower voltage AC input which requires bulk capacitors with a larger capacitance, but these capacitors can be rated for the lower voltage input, e.g. 250V. The control means includes an input AC voltage sensor, and responsive to sensor input indicative of the input AC voltage, the control and driver circuit drives the switches, e.g. transistors, to connect or disconnect the capacitors Cin_LV. This HBCC provides an adaptive capacitor switching arrangement that enables optimization of the bulk capacitors, i.e. to provide required capacitor values and voltage ratings for each required operational voltage range, while reducing or minimizing the volume of the bulk capacitors.

Figure 7:
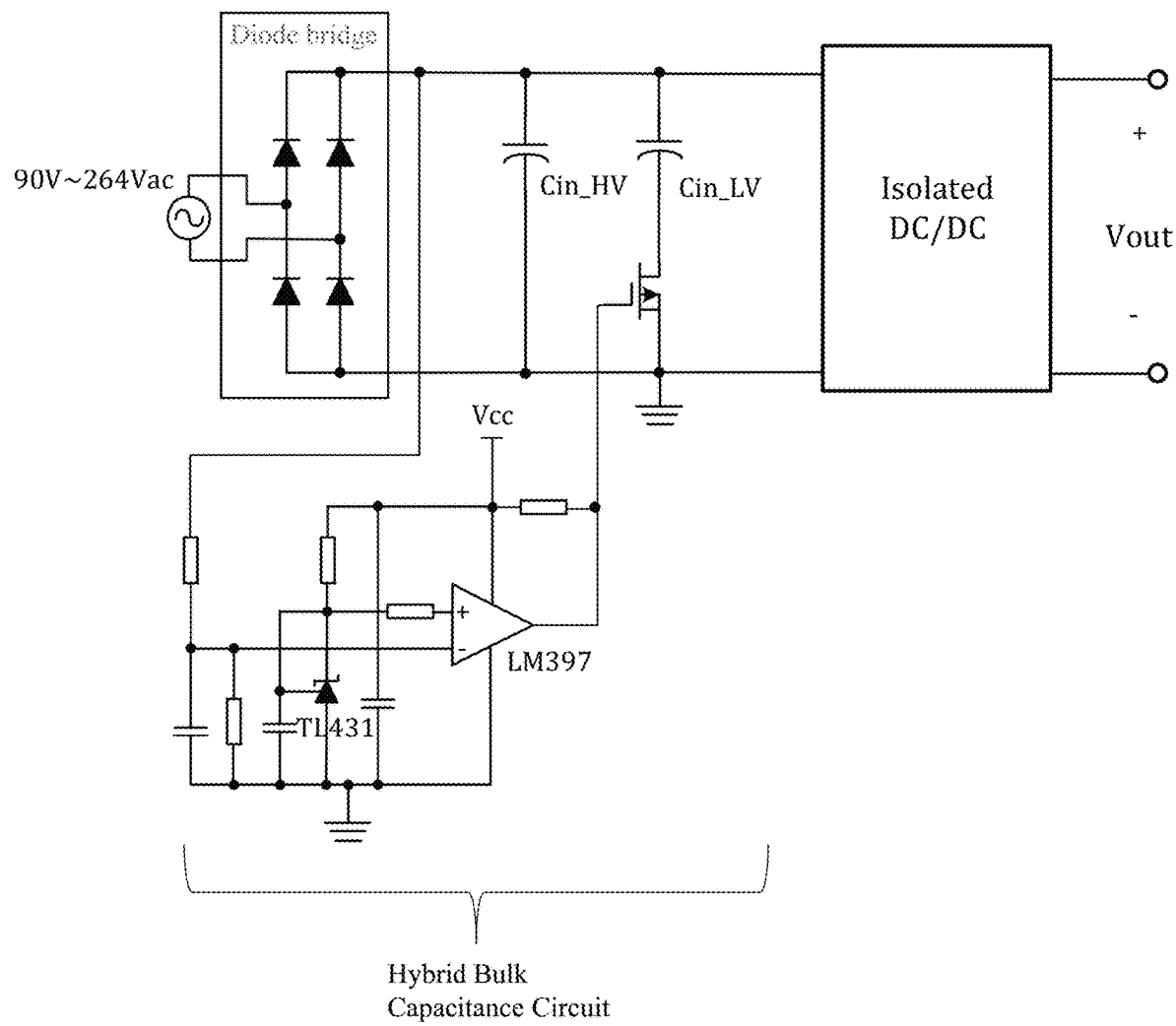
FIG. 7 shows a circuit schematic for an implementation of a hybrid bulk capacitance circuit of an example embodiment including two capacitors.

FIG. 7 shows a circuit schematic for an implementation of a hybrid bulk capacitance circuit of an example embodiment comprising two capacitors, as a simplified example to illustrate this design principle. A first bulk capacitor Cin_HV is connected between the voltage inputs as conventional. The second bulk capacitor Cin_LV is connected between the voltage inputs with a transistor switch, so that the second bulk capacitor Cin_LV can be selected to add bulk capacitance when required for lower voltage operation. Control and driver circuitry receive a signal from an input voltage sensor. The signal is indicative of the input AC input voltage. The control circuitry and driver circuitry then operate the transistor switch to connect the second bulk capacitor Cin_LV in parallel with the first bulk capacitor Cin_HV when required for lower voltage operation. In the implementation of the hybrid bulk capacitance circuit of this embodiment shown in FIG. 7, the input voltage sensor and the control and driver circuit for the capacitor switch is implemented as a comparator circuit. Any suitable implementation of the HBCC circuit comprising the capacitors Cin_HV and Cin_LV, transistor switch, voltage input sensor, and control and driver circuitry may be used and preferably it is simple, compact, and low cost. The voltage after bridge diode is sensed and compared with a reference voltage, which can control and drive the transistor switching to connect/disconnect the second bulk capacitor Cin_LV dependent on, i.e. responsive to, the sensed input voltage. The fast control and switching of capacitors (e.g. using GaN transistors) may speed up the starting up process of the AC/DC charger, also a low Rds_on switch is preferred to reduce the loss on the switch (switching losses); there is a trade-off between the performance and the cost. As shown in FIG. 6, the control and driver circuitry are shown as powered (Vcc) from the auxiliary winding of the isolated DC/DC converter, and the control and driver circuitry includes an enable/disable control output for activating the DC/DC converter, i.e. to disable operation of the DC/DC converter until an appropriate capacitance value has been selected for the sensed AC input voltage, and enable operation after the capacitors are connected as required.

Figures 8, 9:
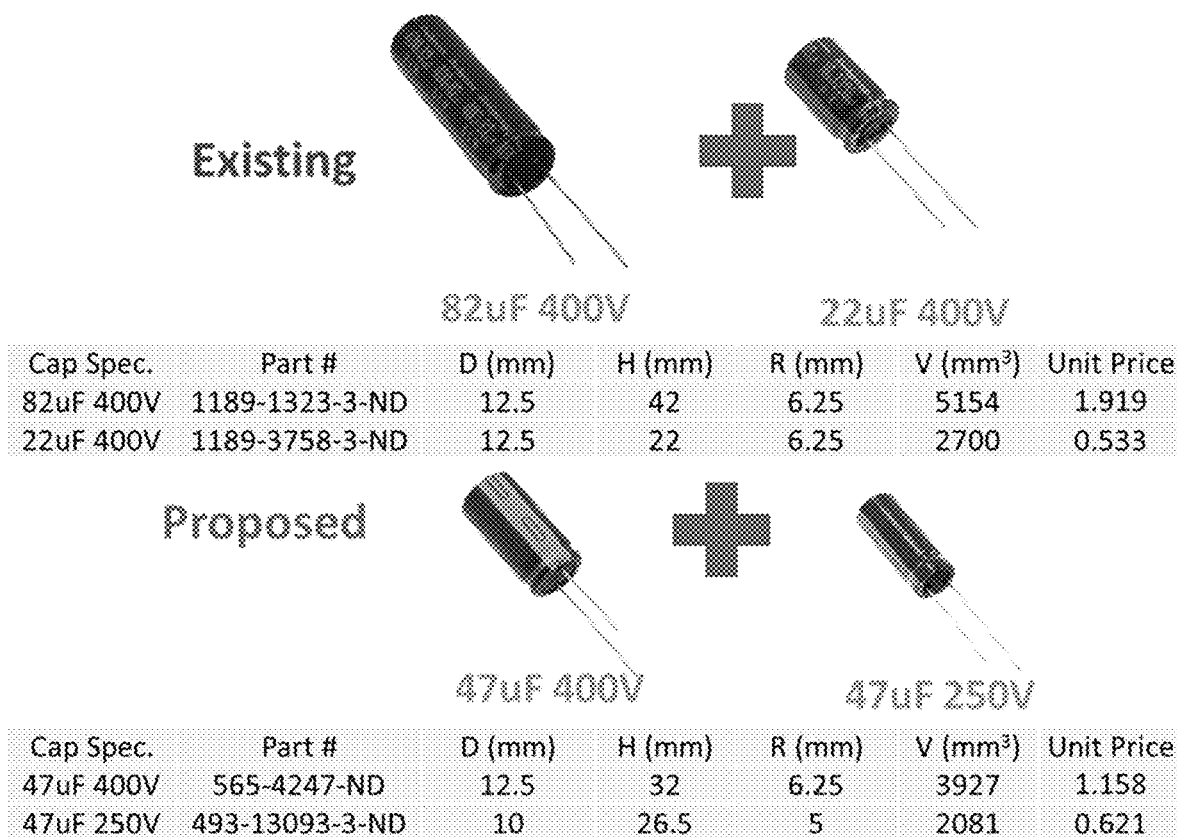
FIG. 8 shows some examples of volumes and characteristics of capacitors for existing and proposed solutions.
FIG. 9 shows a table with a Bill of Materials (BOM) comparison.

In FIG. 8 some examples of volumes and characteristics of capacitors Cin_HV and Cin_LV are specified, and compared with a conventional arrangement where all capacitors are selected to meet a maximum voltage rating. For example, where a conventional arrangement requires a total bulk capacitance of ~100 µF, for a maximum voltage rating of >373V, e.g. capacitors with a voltage rating of 400V, two bulk capacitors are selected to be 82 µF and 22 µF (FIG. 8). 104 uF is the minimum capacitance value required to keep the output of AC/DC charger regulatable. It is also acceptable to use two equal capacitators (eg. two 56 µF 400V capacitors in parallel), However, the total volume will be even higher than the combination of 82 µF and 22 µF. For the hybrid bulk capacitance circuit of the embodiment comprising two capacitors, as illustrated schematically in FIG. 7, the first capacitor calculation shows that, to provide the capacitance value need for HV operation, a 47 µF capacitor, voltage rated at >373V, e.g. 400V is required. For LV operation, an additional 47 µF capacitor is required, but this needs to be voltage rated at only >226V, e.g. 250V (see FIG. 8). This combination of capacitors meets the requirements of a total capacitance of close to 100 µF for lower voltage range operation, when both capacitors are connected. And for higher voltage range operation, only the 47 µF, 400V rated capacitor is connected.

FIG. 8 shows a table with a Bill of Materials (BOM) comparison. A hybrid bulk capacitance circuit, which enables selection of one or more bulk capacitors responsive to the input AC voltage, results in a potential capacitor volume reduction of 23% and cost reduction of 7%. This translates to a system volume reduction of e.g. at least 8%. Because two smaller separate capacitors allow for increased flexibility of the component layout, e.g. with closer packing of components, an arrangement of multiple bulk capacitors as disclosed herein facilitates achieving a multi-voltage AC/DC charger with a higher power density.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A bulk capacitor circuit for a Universal AC input AC/DC charger/adapter comprising:
an input for connection to a power source;
an output for connection to a DC/DC converter;
a plurality of bulk capacitors comprising:
a first bulk capacitor having capacitance value C1 and a voltage rating for a first input voltage range including a maximum rated input voltage, the first bulk capacitor being always connected;
a second bulk capacitor having a capacitance value C2 and a voltage rating for a second input voltage range, below the first first input voltage range, and a switch to selectively connect/disconnect the second bulk capacitor;
an input voltage sensor; and
a control and driver circuitry;
wherein:
the control and driver circuitry is configured to:
receive a signal from the input voltage sensor indicative of the input AC voltage, and responsive to said signal, control the switch to connect/disconnect the second bulk capacitor;
wherein only the first bulk capacitor is connected to provide a capacitance value of C1 for the first input voltage range; and the first and second bulk capacitors are connected to provide a combined capacitance value of C1+C2 for the second input voltage range; and provide a disable/enable signal output to the DC/DC converter, whereby for the second input voltage range, the first and second bulk capacitors are connected prior to enabling the DC/DC converter.

2. The bulk capacitor circuit of claim 1, wherein the capacitor values C1 and C2 are calculated based on a ripple voltage wherein:

$$C=2P_{in}/(V^2_{pkmin}-V^2_{inmin})f_L$$

where $P_{in}$ is the required power, $V_{pkmin}$ is the required peak voltage at the minimum AC input voltage; $V_{inmin}$ is the required valley voltage at the minimum AC input voltage; and $f_L$ is the input line frequency.

3. The bulk capacitor circuit of claim 2, wherein said capacitor values are selected to minimize a total capacitor volume of the plurality of capacitors.

4. The bulk capacitor circuit of claim 1, comprising a third bulk capacitor, wherein:

only the first bulk capacitor is connected for the first input voltage range; the first and second bulk capacitors are connected for the second voltage range, and the first, second and third bulk capacitors are connected for a third input voltage range, wherein the first voltage range is higher than the second voltage range and the second voltage range higher than the third voltage range.

5. The bulk capacitor circuit of claim 1, wherein each of said first and second bulk capacitors comprises one of a single capacitor and multiple single capacitors connected in parallel.

6. The bulk capacitor circuit of claim 1, wherein the Universal input AC/DC charger is rated for an input of 90-265VAC and 47-63Hz, and for a power of ≤100W wherein the first input voltage range comprises 160 to 265VAC and the second input voltage range comprises 90 to 160VAC, the first bulk capacitor C1 is rated at 400V and the second bulk capacitor C2 is rated at 250V, and where C1=C2.

7. The bulk capacitor circuit of claim 1, wherein the DC/DC converter comprises an active clamp flyback topology or other isolated DC/DC topologies.

8. The bulk capacitor circuit of claim 1, wherein the switch is a transistor switch in series with said second bulk capacitor.

9. A Universal AC input AC/DC switching mode power adapter comprising:
a diode bridge rectifier;
a bulk capacitance circuit;
an isolated DC/DC converter;
the bulk capacitance circuit having an input from the diode bridge rectifier and an output to isolated DC/DC converter;
the bulk capacitance circuit comprising:
a plurality of bulk capacitors comprising:
a first bulk capacitor having capacitance value C1 and a voltage rating for a first input voltage range including a maximum rated input voltage, the first bulk capacitor being always connected;
a second bulk capacitor having a capacitance value C2 and a voltage rating for a second input voltage range, below the first first input voltage range, and a switch to selectively connect/disconnect the second bulk capacitor;
an input voltage sensor; and
a control and driver circuitry;
wherein:
the control and driver circuitry is configured to:
receive a signal from the input voltage sensor indicative of the input AC voltage, and responsive to said signal, control the switch to connect/disconnect the second bulk capacitor;
wherein only the first bulk capacitor is connected to provide a capacitance value of C1 for the first input voltage range; and the first and second bulk capacitors are connected to provide a combined capacitance value of C1+C2 for the second input voltage range;
and
provide a disable/enable signal output to the DC/DC converter, whereby for the second input voltage range, the first and second bulk capacitors are connected prior to enabling the DC/DC converter.

10. The power adapter of claim 9, wherein the isolated DC/DC converter has a flyback converter topology.

* * * * *